United States Patent
Doswald

(10) Patent No.: US 8,693,552 B2
(45) Date of Patent: *Apr. 8, 2014

(54) LOW LATENCY CADENCE DETECTION FOR FRAME RATE CONVERSION

(71) Applicant: Broadcom Corporation, Irvine, CA (US)

(72) Inventor: Daniel Doswald, Munich (DE)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,132

(22) Filed: Aug. 8, 2013

(65) Prior Publication Data

US 2013/0321699 A1    Dec. 5, 2013

Related U.S. Application Data

(63) Continuation of application No. 11/616,192, filed on Dec. 26, 2006, now Pat. No. 8,542,747.

(51) Int. Cl.
*H04N 7/12* (2006.01)

(52) U.S. Cl.
USPC ..................... 375/240.26; 348/448

(58) Field of Classification Search
USPC ..................... 375/240.26; 348/448
See application file for complete search history.

(56) References Cited

U.S. PATENT DOCUMENTS

| | | | | |
|---|---|---|---|---|
| 4,998,167 A * | 3/1991 | Jaqua | | 348/443 |
| 5,115,311 A * | 5/1992 | Jaqua | | 348/458 |
| 6,542,198 B1 * | 4/2003 | Hung et al. | | 348/459 |
| 7,548,276 B2 * | 6/2009 | Mizuhashi et al. | | 348/459 |
| 2002/0075400 A1 * | 6/2002 | Shin et al. | | 348/441 |
| 2004/0012673 A1 * | 1/2004 | Tanase et al. | | 348/97 |
| 2005/0243215 A1 | 11/2005 | Doswald et al. | | |
| 2008/0151103 A1 * | 6/2008 | Asamura et al. | | 348/448 |

FOREIGN PATENT DOCUMENTS

| | | |
|---|---|---|
| CN | 1783995 | 6/2006 |
| WO | 2006095470 | 9/2006 |

OTHER PUBLICATIONS

John Watkinson. "The Engineer's Guide to Motion Compensation", Handbook Snell and Wilcox Series, 1994, 1-62, Published by Snell and Wilcox Ltd. Durford Mill Pertersfield Hampshire, GU13 5AZ. (http://www.snellgroup.com/documents/engineering-guides/emotion.pdf).

John Watkinson, "The Engineer's Guide to Standards Conversion", Handbook Snell and Wilcox Series, 1994, 1-57, Published by Snell and Wilcox Ltd. Durford Mill Pertersfield Hampshire, GU13 5AZ. (http://www.snellgroup.com/documents/engineering-guides/estandard.pdf).

Abstract for Chinese Application No. CN1783995 Filed Jun. 7, 2006 (English translation).

* cited by examiner

*Primary Examiner* — Sath V Perungavoor
*Assistant Examiner* — James Pontius
(74) *Attorney, Agent, or Firm* — Thomas|Horstemeyer, LLP

(57) ABSTRACT

A receiver is configured to receive video frames. A cadence detector is in communication with the receiver and is configured to analyze a newly received video frame to determine the cadence of the video frames. A frame rate converter is configured to interpolate at least two of the video frames to form output frames in accordance with an interpolation parameter based on the cadence and with a frequency scaling factor. The frequency scaling factor corresponds to the frame rate of the output frames.

20 Claims, 10 Drawing Sheets

LOW LATENCY CADENCE DETECTION FOR FRAME RATE CONVERSION

CROSS-REFERENCE TO RELATED APPLICATION

This patent application is a continuation of U.S. patent application, titled "Low Latency Cadence Detection for Frame Rate Conversion," having Ser. No. 11/616,192, filed Dec. 26, 2006, which is incorporated herein by reference in its entirety.

FIELD OF THE INVENTION

The present invention relates generally to video processing, and more particularly to frame rate conversion.

BACKGROUND OF THE INVENTION

Moving picture video is typically recorded or encoded at a pre-determined frame rate. For example, cinema films are typically recorded at a fixed rate of 24 frames per second (fps). Video as broadcast for television in accordance with the NTSC standard, on the other hand, is encoded at 30 fps. Video broadcast in accordance with European PAL or SECAM standards is encoded at 25 fps.

Conversion between frame rates has created challenges. One common technique of converting frame rates involves dropping or repeating frames within a frame sequence. For example, telecine conversion (often referred to as 3:2 pull down) is used to convert 24 fps motion picture video to 60 fields per second (30 fps). Each second frame spans 3 fields, while each other second frame spans two fields. Telecine conversion is, for example, detailed in Charles Poynton, Digital Video and HDTV Algorithms and Interfaces, (San Francisco: Morgan Kaufmann Publishers, 2003), the contents of which are hereby incorporated by reference.

Various other techniques for frame rate conversion are discussed in John Watkinson "The Engineer's Guide to Standards Conversion", Snell and Wilcox Handbook Series and "The Engineer's Guide to Motion Compensation", Snell and Wilcox Handbook Series.

More recently, frame rate conversion has not only been used for conversion between standards, but also to enhance overall video quality. For example, in an effort to reduce perceptible flicker associate with conventional PAL televisions, high frame rate 100 fields per second (50 fps) televisions have become available.

In the future, higher frame rates may become a significant component in providing higher quality home video. Existing video, however, is not readily available at the higher frame rate. Accordingly, frame rate conversion will be necessary. Such conversion, in real time presents numerous challenges.

For example, if frame rate conversion introduces material delays, associated audio may no longer be synchronized with the video. Likewise, conversion may need to be performed on video sources that have already undergone telecine or other frame rate conversion.

Accordingly, there is a need for improved frame rate conversion techniques.

SUMMARY OF THE INVENTION

Exemplary of embodiments of the present invention, frame rate converted video is provided by sequentially buffering video frames in a sequence of video frames in a buffer and interpolating at least two of the plurality of video frames in the buffer based on at least one interpolation parameter, to form output frames. Conveniently, the interpolation parameter is adjusted with each newly buffered frame in dependence on the current value of the cadence of the frame sequence. In this way, delays associated with cadence detection may be reduced.

In accordance with an aspect of the present invention, a video device comprises a buffer for buffering a sequence of video frames; a cadence detector, in communication with the buffer to analyses each newly buffered frame in the buffer to determine the cadence of the sequence of video frames, and responsive thereto form a cadence indicator to reflect the cadence; and a frame rate converter for forming interpolated video frames from at least two of the plurality of video frames in the buffer in accordance with an interpolation parameter dependent on the current value of the cadence indicator.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
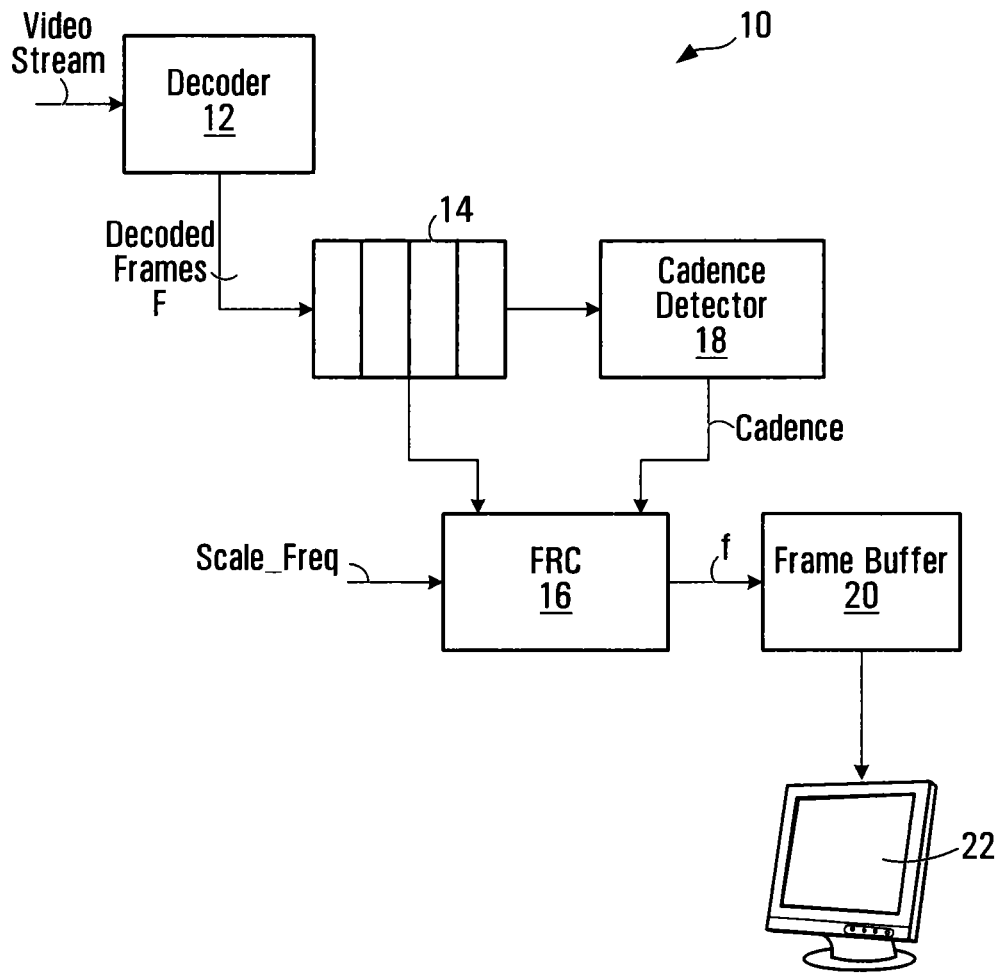
FIG. 1 is a simplified schematic block diagram of a video device, including a frame rate converter, exemplary of an embodiment of the present invention.

FIG. 1 illustrates the video device 10 including a frame rate converter 16, exemplary of an embodiment of the present invention. As illustrated, device 10 includes a video decoder 12 that receives a video signal, in the form of a stream of digital video such as an MPEG 2, MPEG 4, H264 or other digital stream, an analog video decoder, a video interface (such as a DVI, HDMI, VGA, or similar). Video decoder 12 may also include a de-interlacer to produce frames from received fields. Video decoder 12 in turn decodes the stream and provides a stream of decoded pixels forming frames of decoded video to buffer 14. Video decoder 12 similarly outputs a decoded/de-multiplexed audio stream for further processing. The audio stream is typically synchronized with output video frames. Further processing of the decoded/demultiplexed audio stream is not detailed herein.

Video device 10 may take the form of a set top box, satellite receiver, terrestrial broadcast receiver, media player (e.g. DVD player), media receiver, or the like. Device 10 may optionally be integrated in a display device, such as a flat panel television, computer monitor, portable television, or the like.

Device 10 may be formed in custom hardware, or a combination of custom hardware and general purpose computing hardware under software control.

Buffer 14 is a first in first out (FIFO) buffer that stores several frames of video. In the depicted embodiment, buffer 14 stores at least four sequential frames of video—$F_i$, $F_{i+1}$, $F_{i+2}$, and $F_{i+3}$. A frame rate converter 16 is in communication with buffer 14 and extracts frames therefrom in order to produce frames $f_j$ ultimately presented on an interconnected display 22. In the depicted embodiment, frame rate converter 16 stores frames for presentation of display 22 in frame buffer 20. A display interface (not specifically illustrated) samples frame buffer 20 to present images for display. The display interface may take the form of a conventional random access memory digital to analog converter (RAMDAC), a single ended or differential transmitter conforming to the HDMI or DVI standard, or any other suitable interface that converts data in frame buffer 20 for display in analog or digital form on display 22. As will be appreciated, frame buffer 20 is optional and video may be output directly by frame rate converter 16.

A cadence detector 18 analyses adjacent frames in buffer 14 to determine, if decoded video includes frames that repeat in a known pattern. For example, cadence detector 18 determines whether or not generated video frames stem from a source exhibiting 3:2/2:2 or similar pull-down pattern. An indicator of the cadence is provided to frame rate converter 16.

Functional blocks of device 10 (including video decoder 12, cadence detector 18, frame rate converter 16) may be formed using conventional VLSI design techniques and tools known to those of ordinary skill.

Figure 2:
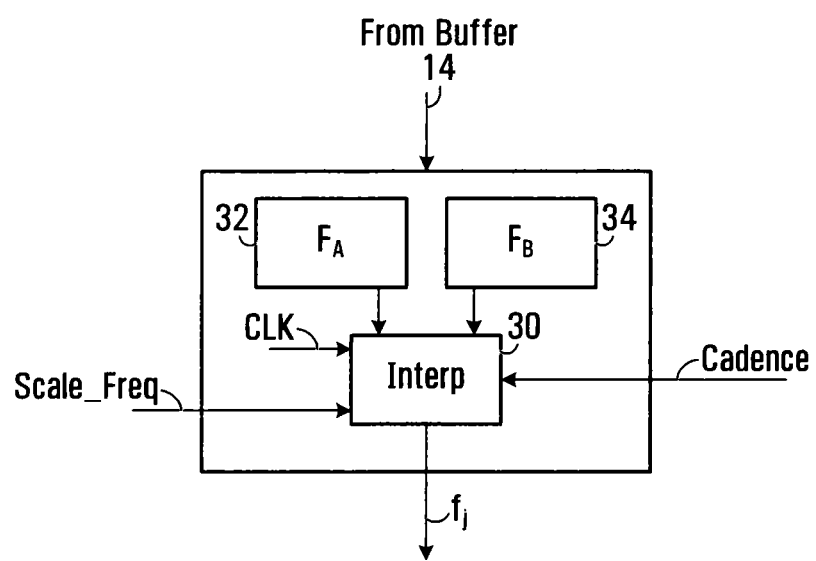
FIG. 2 is a simplified schematic block diagram of a frame rate converter forming part of the device of FIG. 1.

A more detailed block diagram of frame rate converter 16 is depicted in FIG. 2. Frame rate converter 16 includes an interpolator 30 that interpolates frames within buffer 14 in order to allow for frame-rate conversion. Optional internal buffers 32 and 34 may store frames that may be combined by interpolator 30. Interpolator 30 may further be provided with cadence information about frames in the currently decoded frame sequence. Further, a frequency scaling factor SCALE_FREQU and clock signal (CLK) for deriving the resulting frame rate, may be provided to interpolator 30.

Figure 3:
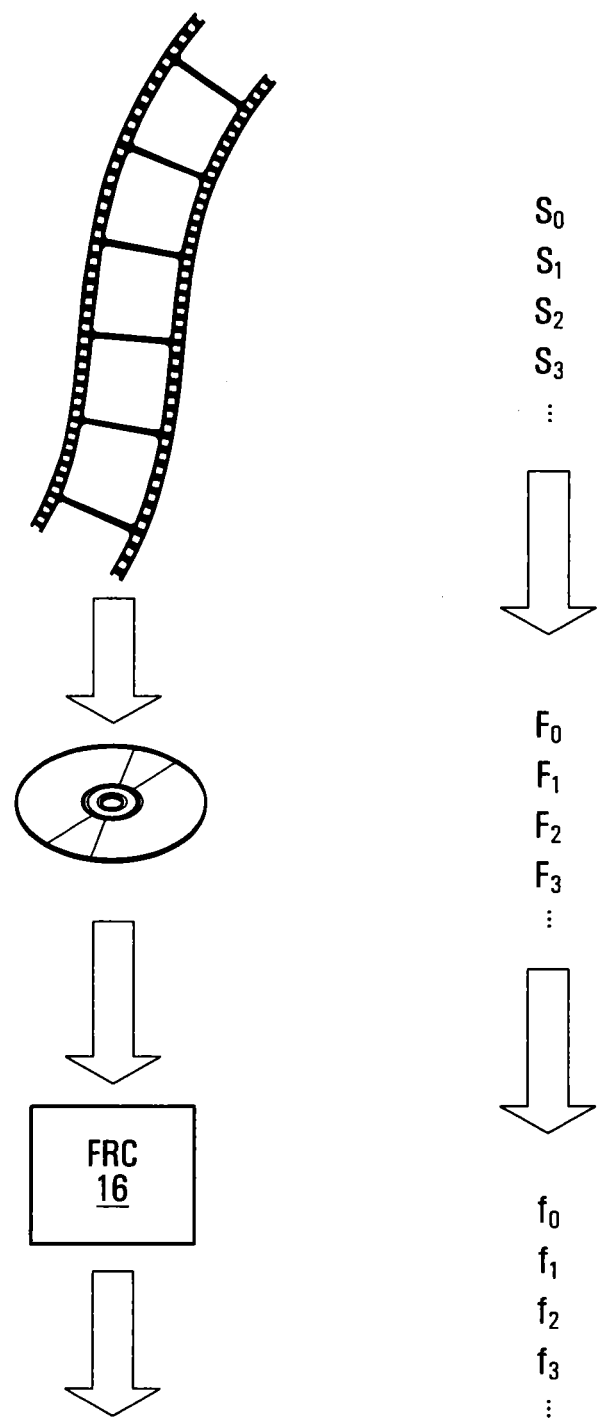
FIG. 3 schematically illustrates frames in frame rate converted output; decoded output; and an original video source.

For clarity, as described herein, buffered frames (e.g. decoded frames output by video decoder 12) are referred to as frames $F_0$, $F_1$, $F_2$, ... $F_n$, while unique frames in the video source are referred to as frames $S_0$, $S_1$, $S_2$, .... Thus, for example, a 24 fps source may have source frames $S_0$, $S_1$, $S_2$, $S_3$ ... and may have been converted to telecine format that would be decoded and/or reconstructed by video decoder 12 as frames $\{F_0, F_1, F_2, F_3, F_4, F_5, F_6, F_7, F_8, F_9, ...\}$ (at 60 fps) corresponding to source frames $\{S_0, S_0, S_0, S_1, S_1, S_2, S_2, S_2, S_3, S_3 ...\}$. Telecine converted frames $F_0$, $F_1$, ... may be stored on a recording medium, such as a DVD or the like, or broadcast using terrestrial, satellite or CATV broadcast techniques, in either analog (e.g. NTSC) format, or in digital format (e.g. MPEG stream, or the like), or be otherwise provided. Output frames, with converted frame rate, in turn will be referred as frames $f_0$, $f_1$, $f_2$ ... $f_n$, and may be formed from frames $F_0$, $F_1$, ..., as detailed herein. This is schematically illustrated in FIG. 3.

Interpolated frames are also denoted as $I\{S_j, S_{j+1}, l/m\}$, herein. This notation signifies a resulting motion interpolated frame that represents an intermediate frame between the original frames $S_j$, $S_{j+1}$, interpolated to represent fractional $l/m$ motion from $S_j$ to $S_{j+1}$. For example, an interpolated frame $I\{S_j, S_{j+1}, \frac{1}{2}\}$, is a frame formed to represent motion halfway between $S_j$ and $S_{j+1}$. Such motion interpolation is performed by frame rate converter 16, from two input frames in buffers 32 and 34. Motion compensation/interpolation techniques that may be performed by interpolator 30 are generally discussed in Keith Jack, Video, 2005, Demystified (A handbook for the Digital Engineer), 4th ed., and John Watkinson, "The Engineer's Guide to Motion Compensation", Snell and Wilcox Handbook Series (published by Snell & Wilcox, Ltd. 1994), John Watkinson, "The Engineer's Guide to Standards Conversion", Snell and Wilcox Handbook Series, (published by Snell & Wilcox, Ltd. 1994), the contents of all of which are hereby incorporated by reference.

Figure 4:
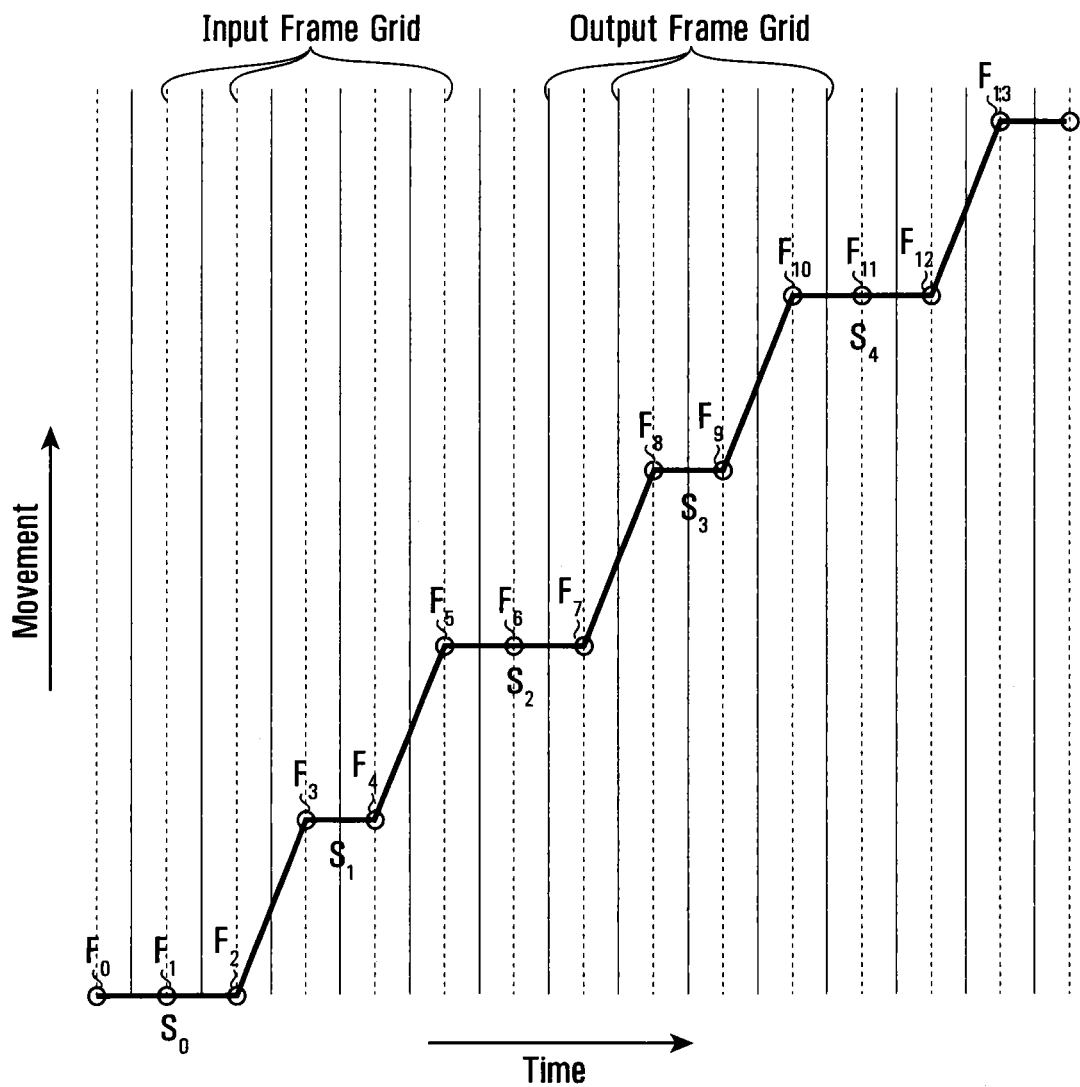
FIG. 4 is a motion graph, illustrating motion in a video frame sequence, exhibiting a 3:2 pull-down pattern.

FIG. 4 illustrates motion in an example frame sequence, as decoded by video decoder 12. More specifically, FIG. 4 illustrates the motion of an example frame sequence, $F_0$, $F_1$, $F_2$, $F_3$ ... decoded by video decoder 12. The depicted frame sequence originates with a 3:2 pull-down source, typically resulting from a conversion of 24 frames per second (denoted as source frames $S_0$, $S_1$, $S_2$, $S_3$ ... ) to 60 interlaced fields per second, converted to 60 fps frames. As such, each second frame in the original (cinema) source is sampled twice, while every other second frame in the original source is sampled three times. Resulting frames $F_0$, $F_1$, $F_2$, $F_3$ exhibit the 3:2 pull-down pattern as they are formed by de-interlacing the interlaced fields.

The resulting frame sequence, exhibits jerky motion (referred to as "judder"), with motion only after the 3rd, 5th, 8th, 10th, etc. decoded frame. This judder remains after frame rate conversion that does not account for the cadence of the video source.

Figure 7:
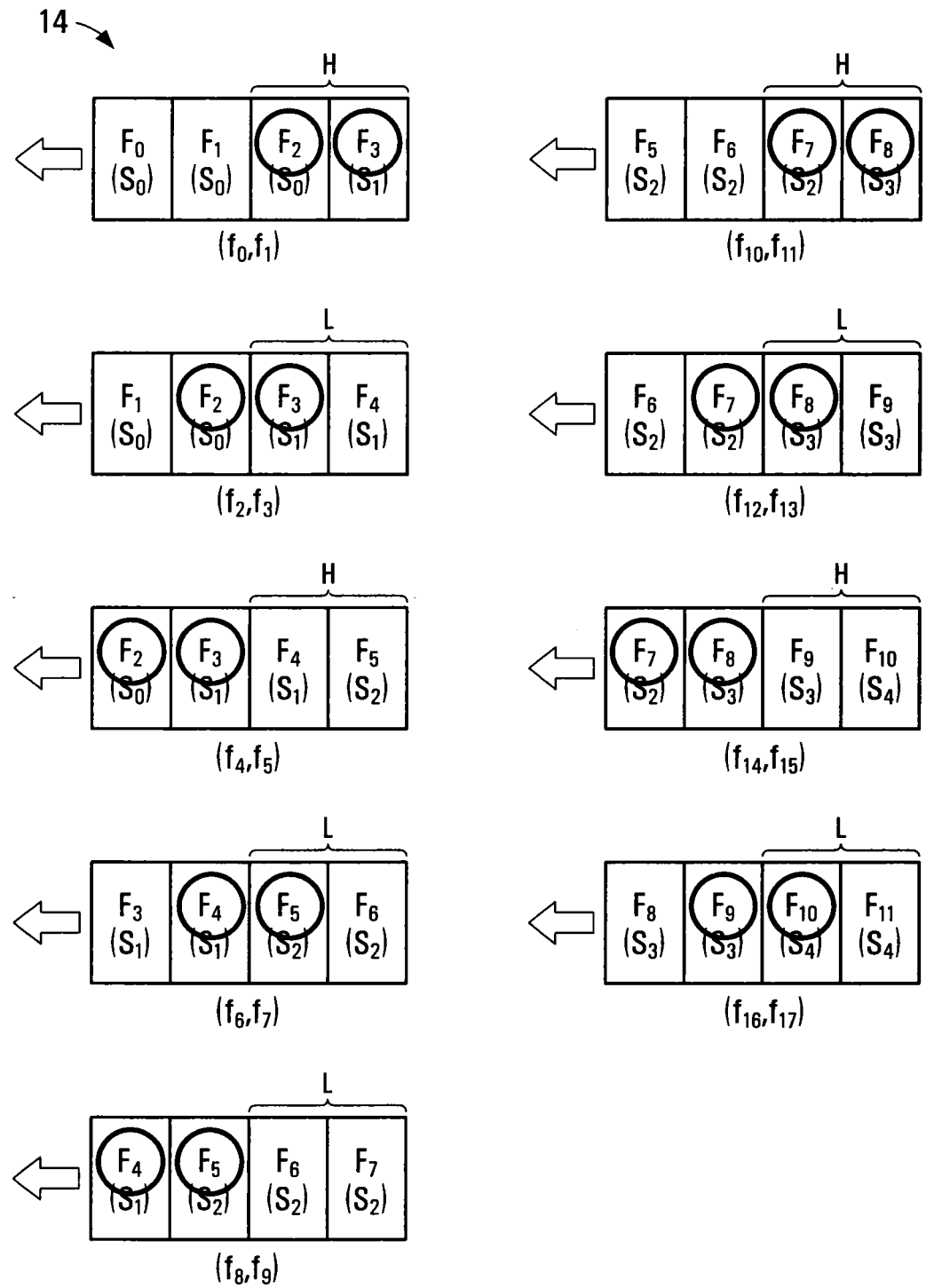
FIG. 7 schematically illustrates the contents of a buffer in producing the video output of FIGS. 5 and 6.

In an effort to remove or reduce perceptible judder, frame rate converter 16 of device 10 interpolates adjacent source frames, in order to form a rate converted frame sequence. To do so, cadence detector 18, first detects the presence of the pull-down pattern. Specifically, cadence detector 18 may determine of a pull-down pattern by comparing the contents of two adjacent frames in buffer 14 for a sequence of frames decoded by video decoder 12. For example, comparing the most recently buffered frame in buffer 14 (i.e. $F_{i+3}$) with its immediate neighbor (i.e. $F_{i+2}$) over multiple decoded frames reveals a pattern of frame similarities/differences in adjacent frames. For example, denoting frame differences with H, and similarities with L, cadence detector 18 may assess a 3:2 pull-down pattern by recognizing an HLHLLHLHLL HLH ... difference pattern in adjacent frames. The contents of buffers 14 for multiple decoded frames $F_0$ ... $F_{11}$ is illustrated in FIG. 7.

Frame rate converter 16 is provided with an identifier of the pull-down pattern by cadence detector 18 to perform interpolation, in order to produce motion compensated, interpolated frames from the original source frames. In order to accurately interpolate, the cadence indicator may be used to interpolate different (as opposed to repeated) frames in the source, and to adjust interpolation parameters (e.g. desired fractional motion from interpolated frame to interpolated frame).

Figure 5:
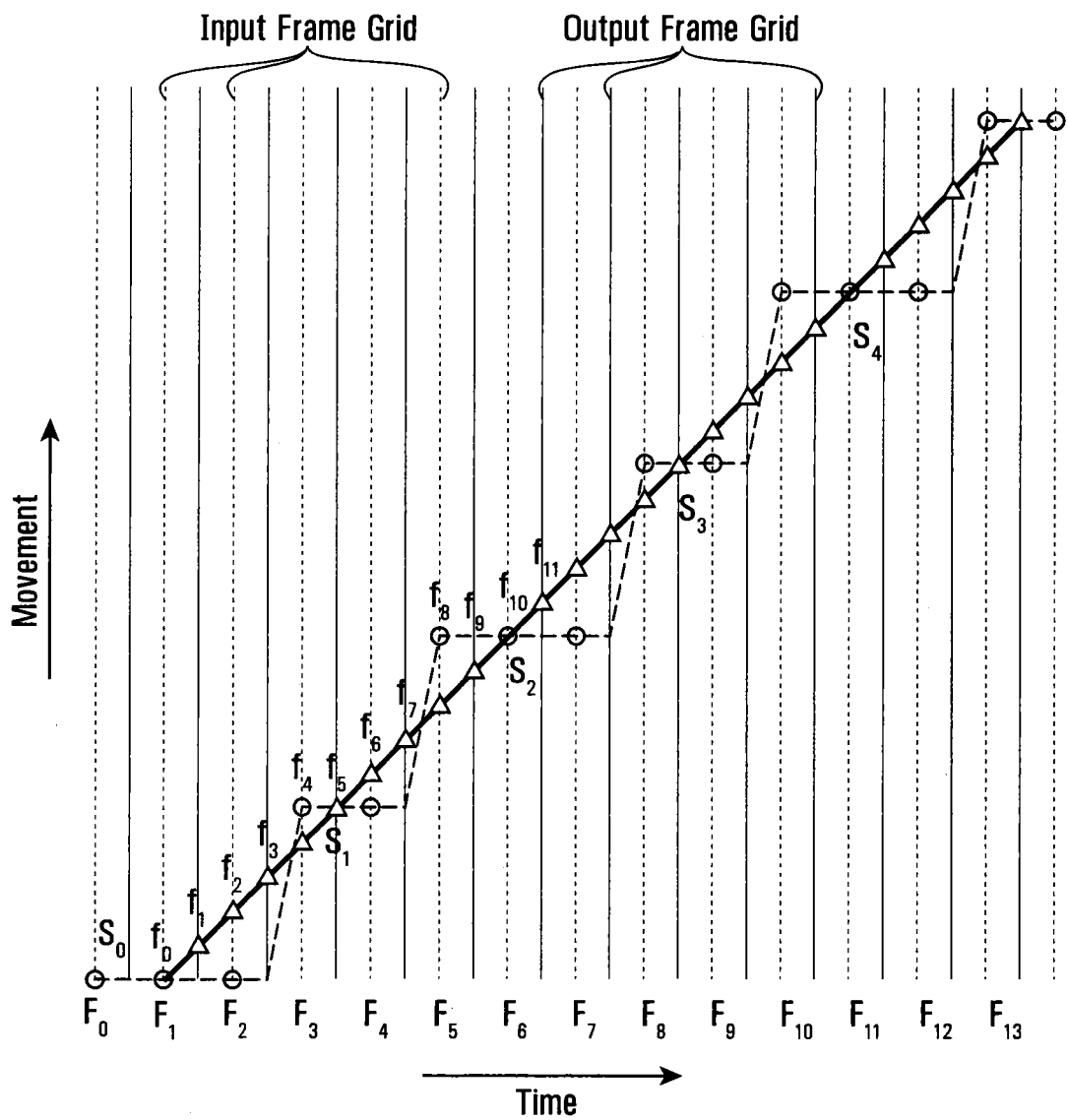
FIG. 5 is a motion graph illustrating motion in a frame rate converted video output from a decoded frame sequence, exhibiting a 3:2 pull-down pattern.
Figure 6:
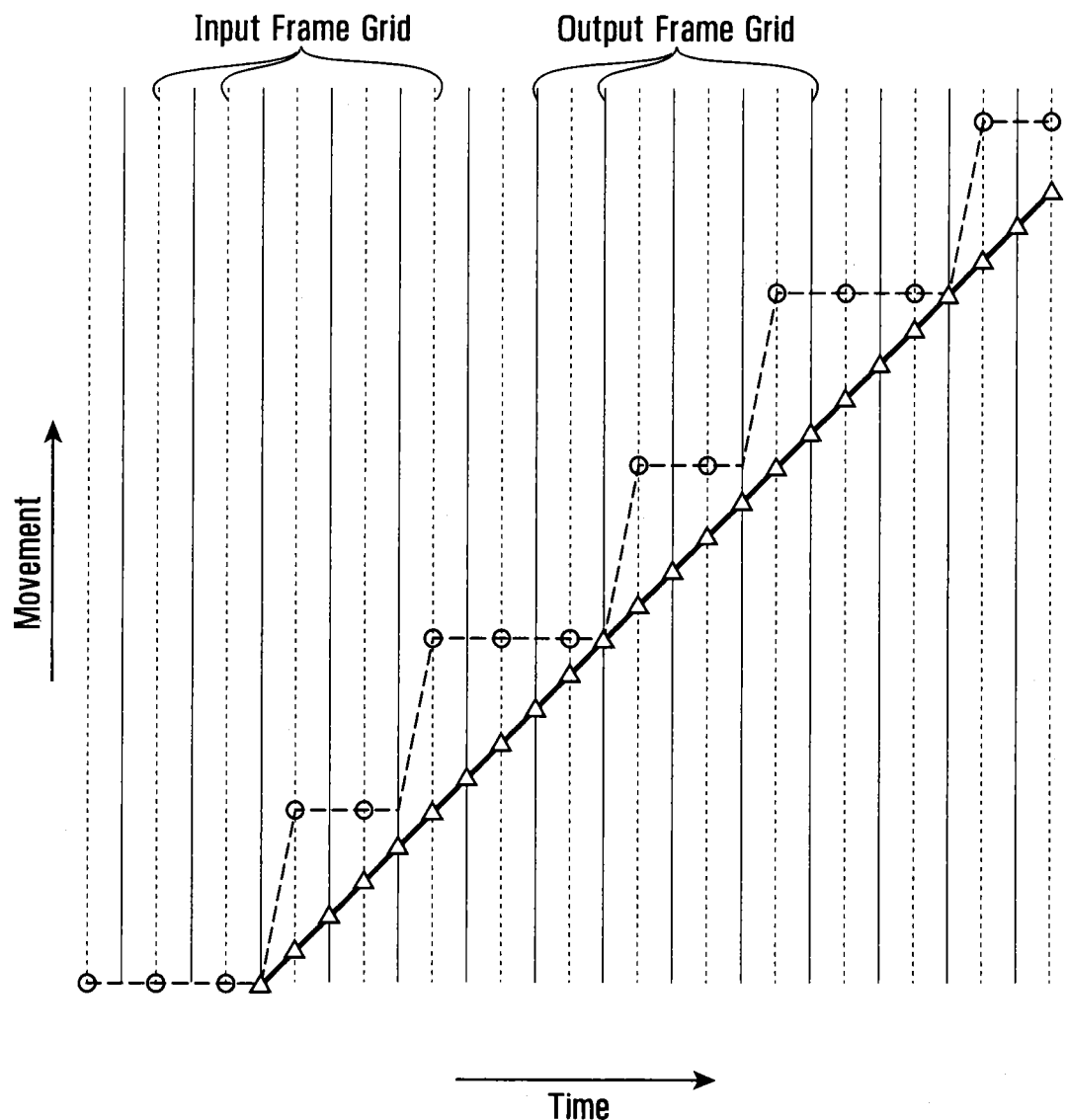
FIG. 6, is a motion graph illustrating motion in the frame rate converted video output of FIG. 5, illustrating decoding latency.

FIGS. 5 and 6 illustrates motion in a desired output frame sequence $f_0$, $f_1$, $f_2$, $f_3$ ... output by frame rate converter 16, from a decoded frame sequence $F_0$, $F_1$, $F_2$ .... In FIG. 5, motion is depicted as a function of frame number. The same motion is depicted in FIG. 6, as a function of time, taking into account delay associated with buffering incoming video, and deciding which frames should be combined. In the depicted example, frame rate converter 16 doubles the frame rate (i.e. SCALE_FREQU=2). As more frames are output by frame rate converter 16, than originally produced by video decoder 12, interpolator 30 (FIG. 2) of frame rate converter 16 uses conventional motion compensation techniques in order to produce frames for presentation at the higher rate. In the depicted embodiment, each interpolated frame $f_j$ is either identical to a frame $F_i$ output by video decoder 12, or formed from two adjacent source frames in the decoded frame sequence (e.g. $S_i$, $S_{i+1}$). Of course, more than two adjacent source frames could be used in producing interpolated frames.

In the illustrated example, motion compensation is performed to produce relatively smooth motion, and to reduce judder. In the depicted embodiment, motion is linearly interpolated, with equal motion between each of frames $f_0$, $f_1$, $f_2$, $f_3$, and so on. As sequential source frames S are not decoded at equal time intervals, any linearly interpolated sequence $f_0$, $f_1$, $f_2$, $f_3$ ... will typically not include frames corresponding to frames $S_0$, $S_1$, ... in the source, at the same times as these are decoded by video decoder 12.

Notably, $f_0=F_1$, while $f_1$, $f_2$, $f_3$, and $f_4$ are derived from an interpolation of $F_0$ (or equivalent frames $F_1$ or $F_2$) and $F_3$ (i.e. source frame $S_0$ and $S_1$). Each interpolated frame $f_1$, $f_2$, $f_3$, and $f_4$ advances motion from $F_0$ to $F_3$ (i.e. from frame $S_0$ to frame $S_1$ of the original source). Output frame $f_5$ is original source frame $S_1$ (i.e. frame $F_3/F_4$). Output frame $f_6$, and $f_7$ are similarly derived from decoder frames $F_3/F_4$ and $F_5$ (corresponding to source frames $S_1$ and $S_2$).

In the presence of a 3:2 pull-down pattern, frame rate converter 16 relies on buffered frames that are up to three frames apart (i.e. $F_0$ and $F_3$; $F_3$ and $F_5$), frame rate converter 16 will introduce a processing delay of at least this many frames. Thus $f_1$ is produced no earlier than after decoding of $F_3$. Similarly, $f_6$ is produced no earlier that after decoding $F_5$; and $f_{11}$ is produced no earlier than after decoding $F_8$. This is reflected in FIG. 6, which depicts source frames f and resulting frames F arranged in time, taking into account the delay resulting from source frames not being immediately available. By contrast, FIG. 5 depicts source frames f and resulting frames F arranged in frame order disregarding the delay in the arrival of source frames f (i.e. assuming that all source frames are available a priori for the formation of output frames F).

Now, in the case 3:2 pull-down pattern and a frequency scaling of two, ten output frames are ideally produced for every five (3+2) buffered frames. This is also apparent in FIGS. 5 and 6. Resulting frames $f_0$, $f_1$, $f_2$, $f_3$, $f_4$, $f_5$ ... $f_{10}$ correspond to $S_0$, $I\{S_0, S_1, 1/5\}$, $I\{S_0, S_1, 2/5\}$, $I\{S_0, S_1, 3/5\}$, $I\{S_0, S_1, 4/5\}$, $S_1$, $I\{S_1, S_2, 1/5\}$, $I\{S_1, S_2, 2/5\}$, $I\{S_1, S_2, 3/5\}$, $I\{S_1, S_2, 4/5\}$, $S_2$.

By contrast, the resulting frame pattern $f_0$, $f_1$, $f_2$, $f_3$ ... $f_{10}$ for a 2:2 pull-down source would correspond to frames $S_0$, $I\{S_0, S_1, 1/4\}$, $I\{S_0, S_1, 1/2\}$, $I\{S_0, S_1, 3/4\}$, $S_1$, $I\{S_1, S_2, 1/4\}$, $I\{S_1, S_2, 1/2\}$, $I\{S_1, S_2, 3/4\}$, $S_2$, $I\{S_2, S_3, 1/4\}$, $I\{S_2, S_3, 1/2\}$ .... That is, four output frames are produced for every buffered frame.

Similarly, the resulting frame pattern for no pull-down pattern (e.g. resulting from interlaced video) would correspond to frames $S_0$, $I\{S_0, S_1, 1/2\}$, $S_1$, $\{S_1, S_2, 1/2\}$, $S_2$, $\{S_2, S_3, 1/2\}$ .... Two output frames are produced for every buffered frame.

Of course, depending on the cadence of the decoded frames F, the location of source frames S in buffer 14 will vary. To illustrate, the source frames within buffer 14 used for forming the output frames in FIGS. 5 and 6 are highlighted in FIG. 7.

From this discussion, it should be apparent that in order to smoothly interpolate frames, the following should be available:
1. source image frames (at least two adjacent ones in the original source);
2. the relationship between the desired output frame and the source frames (e.g. the location between two source frames).

This information can, for example, be derived from the amount of desired motion from frame to frame in the interpolated frame sequence (i.e. the slope of the motion/frame diagram illustrated in FIG. 5); the decoded frame sequence (i.e. $F_0$, $F_1$, ...); knowledge of the structure of buffer 14; and the cadence of the decoded sequence.

Frames F, are written into buffer 14 over time. The amount of time required for each frame may vary, depending on the source of the frame. It may, for example, take the entire period of the original frame rate to buffer a frame F. Frames are only analyzed for cadence once the entire frame is present. This means new interpolation parameters are typically only available some processing time after the end of the frame is received, and therefore only for the next frame. Interpolation, on the other hand, does not require an entire frame to be buffered. Specifically, once a first portion of a newly buffered frame is buffered in buffer 14, interpolation can start.

Interpolation itself will introduce some processing delay. The small delay from frame start until interpolation starts, and the delay of the processing itself may be ignored for the purposes of the discussion herein, but may in reality take 1/3 or more of the time between two frames depending on implementation. Nevertheless even if processing delays are ignored, new cadence information will only available for the next frame in view of the very real delays associated with buffering a newly received frame.

Now, in order to unambiguously detect a m:n pull-down pattern, the pull-down pattern can be detected with some certainty after m+n+1 decoded frames. This, however, requires the delay and possible buffering of m+n+1 frames. However, producing any current frame $f_i$ requires only two source frames that are around $f_i$.

Conveniently, as illustrated, in FIGS. 5 and 6, for 3:2 pull-down and frequency scaling of two, frame rate conversion thus need only introduce a delay of 1.5 buffered frames. Exemplary of embodiments of the present invention, instead of analyzing m+n+1 decoded frames, sufficient frames are buffered to produce the current output frame, and cadence detector 18 compares each newly received frame to at least one previously buffered frame to confirm/determine the presence of the expected pull-down pattern, for future interpolated frames.

For 2:2 pull-down, frame rate conversion can similarly be achieved by only introducing a delay of 1 buffered frame; and for no pull-down pattern only a 0.5 buffered frame delay may be introduced. Of course, as the scaling frequency is increased, so is the introduced delay.

Figure 8:
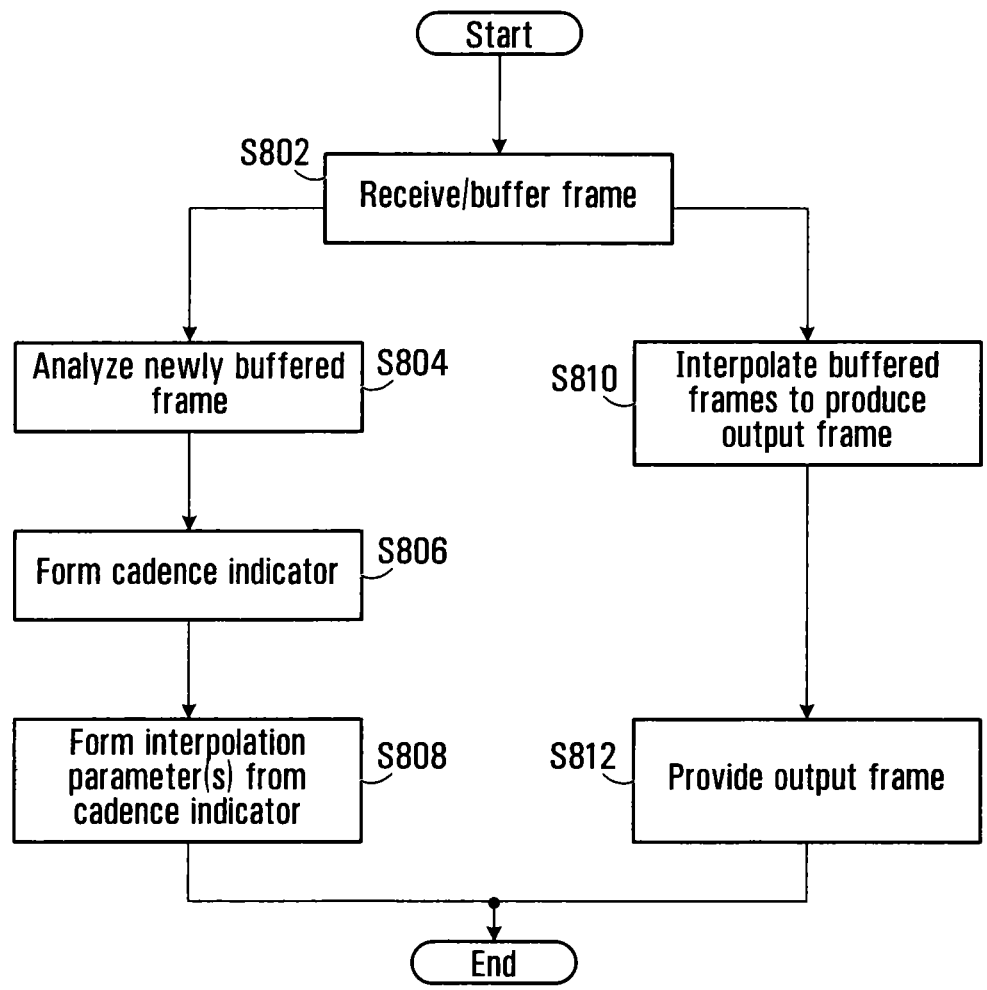
FIG. 8 is a flow chart depicting steps performed by the device of FIG. 1.

More specifically, steps performed by video device 10, for each newly buffered video frame in buffer 14, are illustrated in FIG. 8. As illustrated, upon receipt of a new frame it is buffered in step S802. Buffer 14, acting first in, first out may advance, as is conventional. Buffering of a new frame, may act as a cue to form a new output frame, and determine/confirm the cadence of the frame sequence. Alternatively, a signal consistent with the arrival of new frame in buffer 14, as for example generated by a timing generator (not shown) may be used as the cue.

Specifically, in step S804, cadence detector 18, analyses the newly buffered frame to estimate the cadence of the sequence of video frames. In particular, cadence detector 18 determines if the newly buffered frame is consistent with a known cadence (e.g. 3:2 pull-down; 2:2 pull-down; etc.), based on a comparison of the newly buffered frame and one or more previously buffered frames and/or knowledge of an already detected cadence in the received frames. For example, as illustrated in FIG. 7, cadence may be detected by comparing the newly buffered frame to an immediately previously buffered frame in buffer 14 for similarities or differences (e.g. sum of absolute differences, etc.) in accordance, for example, with methods described in U.S. patent application Ser. No. 10/837,835 or U.S. patent application Ser. No. 11/381,234, the contents of both of which are hereby incorporated by reference herein. A cadence indicator is formed in step S806 that may be provided from cadence detector 18 to frame rate converter 16. The cadence indicator may take any number of values. For example, the cadence indicator may indicate 3:2 pull-down; 2:2 pull-down, or simply unknown cadence.

Frame rate converter 16 forms one or more parameters based on the provided cadence of video frame sequence in step S808. The parameters may, for example, identify which buffered frames within buffer 14 should be combined, and an interpolation parameter (e.g. % MOTION) indicating the position of the output frame relative to the buffered frames (e.g. to what extent buffered frames should be interpolated to form output frames (i.e. to form I{Sa, Sb, % MOTION})). For example, in the presence of 3:2 pull-down pattern, the interpolation parameter causes motion to advance in fractional fifths of frames; in the presence of 2:2 pull-down, in fractional fourths; and in the presence of no pull-down in fractional halves. The interpolation parameter may be used for the next frame to be output by frame rate converter 16

Concurrently, with the analysis of the newly arrived frame, frame rate converter 16, may interpolate an output frame using at least two video frames in the buffer 14, chosen based on a current value of the parameters derived from the cadence indicator provided by cadence detector 18 in step S810.

Frame rate converter 16 combines buffered frames in order to form an output frame. Typically, as the interpolation parameters are only updated after a newly buffered frame has been completely buffered, previously buffered frames are interpolated with interpolation parameters determined using previously received frames (as in the depicted embodiment). Optionally, the newly buffered frame could be used for interpolation as its buffering is being completed.

For example, if the newly buffered frame does not confirm the presence of a previously assumed pull-down pattern (e.g. 3:2 pull-down, etc.), the absence of the pull-down pattern is signaled to frame rate converter 16, and frames F are treated as if no pull-down pattern is present, as future frames are interpolated.

Interpolated output frames are output, for example to frame buffer 20, in step S812.

In this way, interpolation performed by frame rate converter 16 is adapted in dependence on the detected cadence, with each new frame. The next output frame formed by frame rate converter 16 is formed based on any change in cadence.

Figure 9:
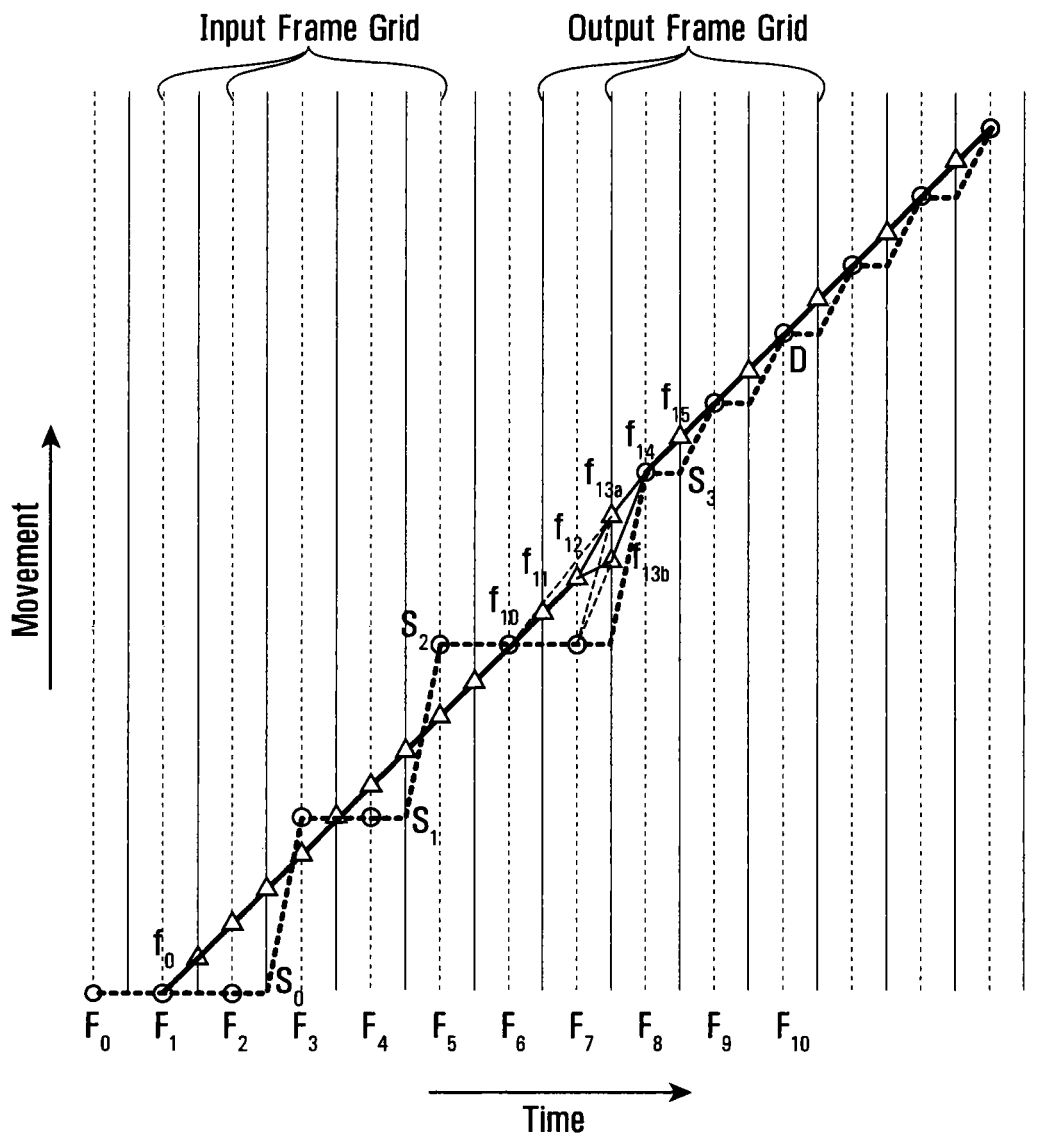
FIG. 9 is a motion graph illustrating motion in a frame rate converted video output from a decoded frame sequence, exhibiting a change from a 3:2 pull-down pattern.

Operation of decoder 10, in the presence of a change in cadence, is best illustrated with reference to FIGS. 9 and 10. Specifically, after initial detection of a 3:2 pull-down pattern three decoded frames $F_j$, $F_{j+1}$, and $F_{j+2}$ are buffered in buffer 14, for construction of the current interpolated frame. As illustrated in FIG. 9, for a 3:2 pull-down, frame zero $f_0$ may be formed using frame $F_1$; frames $f_1$, $f_2$, $f_3$ and $f_4$ using $F_1$ and $F_3$; etc., in much the same way as the output frames are formed in FIG. 5. Significantly, any output frame may be formed using the current frame $F_j$, or the current frame $F_j$ and $F_{j+2}$. As such, forming an interpolated frame from a 3:2 pull-down pattern, introduces a delay of at least 1.5 decoded frames (i.e. 1.5 frames+processing delays, etc.).

Figure 10:
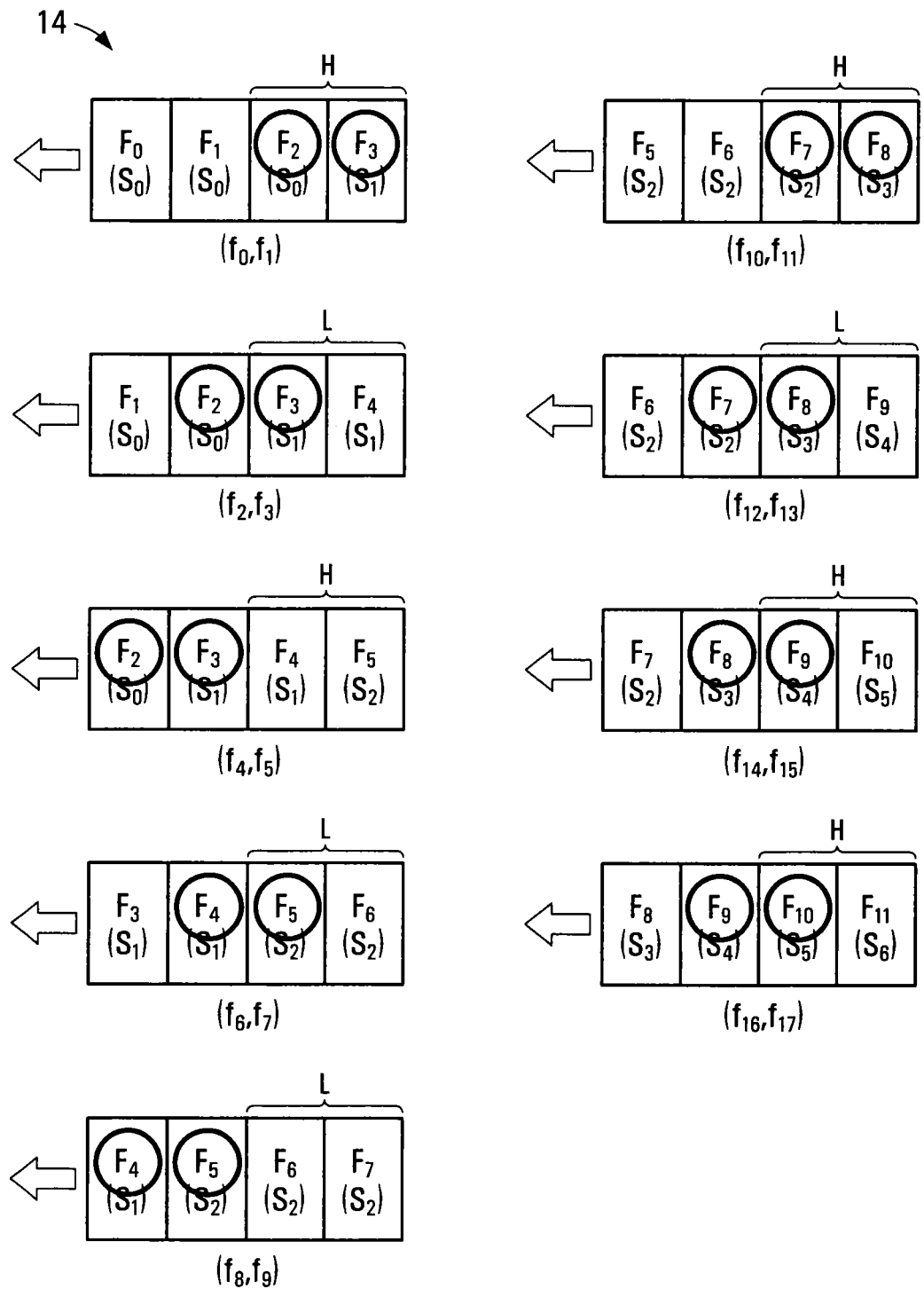
FIG. 10 schematically illustrates the contents of a buffer in producing the video output of FIG. 9.

Buffer 14 (FIG. 1), accordingly stores four frames, including frames $F_j$, $F_{j+1}$, $F_{j+2}$, and $F_{j+3}$ representing at least two sequential frames $S_k$, $S_{k+1}$ in the original source, as illustrated in FIG. 10. Cadence detector 18 may monitor the difference between currently arriving frames, and immediately previous frames, as described above with reference to FIGS. 5 and 6. The detected cadence may be used to adjust interpolation parameters for future interpolated output frames $f_i$.

In operation, after detection of a 3:2 pull-down pattern, interpolator 30 of frame rate converter 16 begins to interpolate adjacent frames to form I{$S_0$, $S_1$, ⅕}, I{$S_0$, $S_1$, ⅖}, I{$S_0$, $S_1$, ⅗}, {$S_0$, $S_1$, ⅘}, $S_1$. Once $f_5$ is output by interpolator 30, buffer 14 contains $S_1$ and $S_2$. As such, $f_6$, $f_7$, $f_8$, and $f_9$ may be easily interpolated from $S_1$ and $S_2$, as I{$S_1$, $S_2$, ⅕}, I{$S_1$, $S_2$, ⅖}, I{$S_1$, $S_2$, ⅗}, I{$S_1$, $S_2$, ⅘}.

Now, if the pull-down pattern changes abruptly (as for example, upon arrival of frame $F_8$ in buffer 14), interpolation based on 3:2 pull-down pattern may not produce an appropriate result. Notably, the change in cadence can only be detected after receipt of frame $F_9$. As such, cadence detector 18 provides an indicator of the change in cadence, after receipt $F_9$, which may be used after $f_{12}$.

In order to unambiguously detect a 3:2 pull-down pattern, at least five frames should be compared to detect the HLLHLHLL . . . pattern, described above. Conveniently, cadence detector 18 immediately signals the lack of 3:2 pull-down pattern within two frames, once an LL or HL pattern is not detected, when expected. Thereafter, interpolation parameters used by interpolator 30 may be adjusted so that future frames are interpolated as if they originate from an interlaced source. That is, the next frame $f_{13}$ (labeled as $f_{13b}$ in FIG. 9) is formed as I{$S_2$, $S_3$, ½} instead of I{$S_2$, $S_3$, ⅗}. Similarly, $f_{14}$ may be formed as $S_3$, and $f_{15}$ as I{$S_3$, $S_4$, ½}. As illustrated in FIG. 10, which frames in buffer 14 are used are chosen accordingly.

Alternatively, frame $f_{13}$ could be formed as I{$S_2$, $S_3$, ¾}, labeled as $f_{13a}$ in FIG. 9.

Again, depending on the cadence of sequence of video frames F, the location of source frames S in buffer 14 will vary. To illustrate, the source frames used for forming the output frames in FIG. 9 are highlighted in FIG. 10.

In an alternate embodiment, cadence information may be provided to frame rate converter from an upstream video processing component, as for example detailed in U.S. application Ser. No. 11/616,188 entitled VIDEO PROCESSOR ARCHITECTURE AND METHOD FOR FRAME RATE CONVERSION, naming the inventor hereof, filed Dec. 26, 2006, and hereby incorporated by reference herein. In this way, cadence information may be provided with each frame, before the entire frame is buffered in buffer 18. By providing the cadence information, interpolation parameters now be charged even more quickly As will now be appreciated, switches from 2:2 pull down, or other pull down pattern may be similarly handled: after detection of a pull-down pattern, interpolation parameters are adjusted for linear interpolation based on the pull down pattern; once a change of cadence is detected frames may be treated as if no pull-down pattern exists.

Similarly, after multiple frames have been analyzed in the absence of a known pull-down pattern, a 3:2, 2:2 or similar known pull-down pattern may be detected, and interpolation parameters may be adjusted accordingly.

Of course, the above described examples have been described in the context of 3:2 and 2:2 pull-down patterns, and scaling frequencies of SCALE_FREQU=2. Other pull-down patterns and scaling frequencies may similarly be used.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method, comprising:
   receiving a plurality of video frames;
   adjusting an interpolation parameter based on detecting a cadence of the plurality of video frames; and
   interpolating at least two of the plurality of video frames that were received based on the interpolation parameter and a frequency scaling factor to form a plurality of output frames, the frequency scaling factor corresponding to a frame rate for the plurality of output frames.

2. The method of claim 1, further comprising analyzing a newly received video frame to determine the cadence of the plurality of video frames.

3. The method of claim 2, wherein the interpolating is performed prior to a completion of the analyzing.

4. The method of claim 1, further comprising receiving an indicator of the cadence from an upstream video processor.

5. The method of claim 4, wherein the interpolation parameter indicates a position in fractional fourths relative to two of the plurality of video frames when the indicator of the cadence corresponds to a 2:2 pull-down pattern.

6. The method of claim 1, wherein the at least two of the plurality of video frames are chosen based on the cadence.

7. The method of claim 1, wherein the interpolation parameter identifies a position of at least one of the plurality of output frames relative to two of the plurality of video frames.

8. The method of claim 1, wherein detecting the cadence comprises comparing a first one of the plurality of video frames to a second one of the plurality of video frames.

9. The method of claim 1, wherein the interpolating produces the plurality of output frames at twice the frame rate at which the plurality of video frames are received.

10. The method of claim 1, wherein the interpolation parameter indicates a position in fractional fifths relative to two of the plurality of video frames when the cadence corresponds to a 3:2 pull-down pattern.

11. The method of claim 1, wherein the interpolation parameter indicates motion in fractional halves between at least a subset of the plurality of video frames responsive to a change in the cadence from a 3:2 pull-down pattern.

12. The method of claim 1, wherein the cadence comprises a 3:2 pull-down pattern and the interpolating introduces a delay corresponding to a time for 1.5 buffered frames of the plurality of video frames, wherein the delay is positioned after receiving one of the plurality of video frames and before forming one of the plurality of output frames.

13. A video device comprising:
    a receiver configured to receive a plurality of video frames;
    a cadence detector in communication with the receiver, the cadence detector configured to analyze a newly received video frame to determine a cadence of the plurality of video frames; and
    a frame rate converter configured to interpolate at least two of the plurality of video frames to form a plurality of output frames in accordance with an interpolation parameter based on the cadence and with a frequency scaling factor, the frequency scaling factor corresponding to a frame rate of the plurality of output frames.

14. The video device of claim 13, wherein the cadence detector compares the newly received video frame to one of the plurality of video frames to determine the cadence.

15. The video device of claim 13, wherein the interpolation parameter identifies a position of at least one of the plurality of output frames relative to two of the plurality of video frames.

16. The video device of claim 15, wherein the frame rate converter produces the plurality of output frames at twice the frame rate at which the plurality of video frames are received.

17. The video device of claim 16, wherein when the cadence comprises a 3:2 pull-down pattern, and the interpolation parameter indicates the position in fractional fifths relative to two of the plurality of video frames.

18. The video device of claim 17, wherein when the cadence detector detects a change in the cadence from a 3:2 pull-down pattern, and the interpolation parameter indicates motion in fractional halves between a first one of the plurality of video frames and a second one of the plurality of video frames.

19. The video device of claim 16, wherein when the cadence comprises a 2:2 pull-down pattern, and the interpolation parameter indicates the position in fractional fourths relative to two of the plurality of video frames.

20. A display device comprising:
    a receiver configured to receive a plurality of video frames;
    a cadence detector in communication with the receiver, the cadence detector configured to analyze a newly received video frame to determine a cadence of the plurality of video frames;
    a frame rate converter for interpolating at least two of the plurality of video frames to form a plurality of output frames in accordance with an interpolation parameter based on the cadence and with a frequency scaling factor, the frequency scaling factor corresponding to a frame rate of the plurality of output frames; and
    a display in communication with the frame rate converter, the display configured to receive the plurality of output frames.

* * * * *